United States Patent
Sugar et al.

(10) Patent No.: US 6,862,456 B2
(45) Date of Patent: Mar. 1, 2005

(54) SYSTEMS AND METHODS FOR IMPROVING RANGE FOR MULTICAST WIRELESS COMMUNICATION

(75) Inventors: Gary L. Sugar, Rockville, MD (US); Chandra Vaidyanathan, Bethesda, MD (US)

(73) Assignee: Cognio, Inc., Gaithersburg, MD (US)

(*) Notice: Subject to any disclaimer, the term of this patent is extended or adjusted under 35 U.S.C. 154(b) by 369 days.

(21) Appl. No.: 10/174,690

(22) Filed: Jun. 19, 2002

(65) Prior Publication Data

US 2003/0181165 A1 Sep. 25, 2003

Related U.S. Application Data

(60) Provisional application No. 60/361,055, filed on Mar. 1, 2002, and provisional application No. 60/365,774, filed on Mar. 21, 2002.

(51) Int. Cl.$^7$ ................................................ H04B 7/01
(52) U.S. Cl. .................... 455/503; 455/521; 455/562.1; 370/349
(58) Field of Search ................................. 455/503, 502, 455/517, 518, 521, 561, 562.1; 370/445, 328, 349

(56) References Cited

U.S. PATENT DOCUMENTS

| | | | |
|---|---|---|---|
| 5,457,808 A | 10/1995 | Osawa et al. ............... | 455/8 |
| 5,570,366 A | 10/1996 | Baker et al. | |
| 5,761,193 A | 6/1998 | Derango et al. | |
| 5,812,531 A | 9/1998 | Cheung et al. | |
| 5,898,679 A * | 4/1999 | Brederveld et al. ......... | 370/315 |
| 5,912,921 A * | 6/1999 | Warren et al. .............. | 375/220 |
| 5,930,248 A * | 7/1999 | Langlet et al. .............. | 370/347 |
| 6,023,625 A | 2/2000 | Myers, Jr. .................... | 455/503 |
| 6,118,788 A * | 9/2000 | Kermani et al. ............. | 370/461 |
| 6,144,651 A | 11/2000 | Rinchiuso et al. | |
| 6,157,843 A | 12/2000 | Derango et al. | |
| 6,185,440 B1 * | 2/2001 | Barratt et al. ............ | 455/562.1 |
| 6,252,884 B1 | 6/2001 | Hunter | |
| 6,298,092 B1 * | 10/2001 | Heath et al. ................ | 375/267 |
| 6,377,819 B1 * | 4/2002 | Gesbert et al. .......... | 455/562.1 |
| 6,549,786 B2 * | 4/2003 | Cheung et al. ............. | 455/524 |
| 6,687,492 B1 * | 2/2004 | Sugar et al. ............. | 455/276.1 |
| 2002/0172186 A1 * | 11/2002 | Larsson ...................... | 370/349 |

OTHER PUBLICATIONS

Sanchez et al., "CSMA/CA with Beam Forming Antennas in Multi–hop Packet Radio," Proc. For Swedish Workshop on Wireless Ad–Hoc Networks, Mar. 5–6, 2001.
Briesemeister et al., "Role–Based Multicast in Highly Mobile but Sparsely Connected Ad Hoc Networks," First Annual Workshop on Mobile Ad Hoc Networking & Computing, pp. 45–50, Aug. 2000.
PCT Search Report from counterpart PCT application No. PCT/US03/05646 filed Feb. 22, 2003.

* cited by examiner

Primary Examiner—Tilahun Gesesse
(74) Attorney, Agent, or Firm—D. Andrew Floam, Esq.

(57) ABSTRACT

Methods to optimize range of multicast signal communication in wireless communication applications that use range-enhanced techniques for directed signal communication. A multicast signal may be sent multiple times through each of a plurality of independent omnidirectional transmit antennas of a communication device to a plurality of other communication devices to improve packet error rate (PER) at a given range (i.e., SNR). More generally, the multicast message can be transmitted up to N times using up to N times using any set of N complex linearly independent N-dimensional transmit weight vectors $v_1, \ldots, v_N$ associated with N plurality of transmit antennas that meets the power constraint $\|v_i\|^2 = 1$, $i=0, \ldots, N-1$, where the vector $v_i$ is used for the ith transmission of the multicast signal.

20 Claims, 9 Drawing Sheets

SYSTEMS AND METHODS FOR IMPROVING RANGE FOR MULTICAST WIRELESS COMMUNICATION

This application claims priority to U.S. Provisional Application No. 60/361,055, filed Mar. 1, 2002 and to U.S. Provisional Application No. 60/365,774 filed Mar. 21, 2002, the entirety of both which are incorporated herein by reference.

BACKGROUND OF THE INVENTION

The present invention relates to enhancing the range in a wireless communication application where communication devices may transmit multicast signals as well as directed signals.

Composite Beamforming (CBF) is an antenna processing technique in which a first communication device, having a plurality of antennas, weights a signal to be transmitted by its antennas to a second communication device also having a plurality of antennas. Similarly, the second communication device weights and combines the received signals received by its antennas. The transmit weights and receive weights are determined to optimize the link margin between the devices, thereby significantly extending the range of communication between the two communication devices. Techniques related to composite beamforming are the subject matter of commonly assigned co-pending applications filed on even date and entitled "System and Method for Antenna Diversity Using Joint Maximal Ratio Combining" and "System and Method for Antenna Diversity Using Equal Gain Joint Maximal Ratio Combining," the entirety of both which are incorporated herein by reference. There are other techniques to improve the link margin for directed signal transmissions between two communication devices, including antenna selection diversity, for example.

Link margin improvement translates into a corresponding improvement in range, data rate at a given range, infrastructure cost to support a given data rate, and interference immunity. However, the range improvement afforded by CBF applies to signals that are sent in a point-to-point fashion from one device to another. Many wireless applications also require multicast signal communication, i.e., point to multi-point. Therefore, to improve the overall range related parameters of a wireless application, it is necessary to also improve the range of multicast signal transmissions. No such range improvement techniques for multicast communication are heretofore known.

SUMMARY OF THE INVENTION

Methods are provided to optimize range of multicast signal communication in wireless communication applications that use range-enhanced techniques for directed signal communication. An example of the techniques for range enhancement for directed signal communication is the composite beamforming techniques described above. A multicast signal may be sent multiple times through each of a plurality of independent omnidirectional transmit antennas of a communication device to a plurality of other communication devices to improve packet error rate (PER) at a given range (i.e., SNR). More generally, the multicast signal can be transmitted up to N times using any set of N complex linearly independent N-dimensional transmit weight vectors $v_1, \ldots, v_N$ associated with N plurality of transmit antennas that meets the power constraint $\|v_i\|^2 = 1$, $i=0, \ldots, N-1$, where the vector $v_i$ is used for the $i^{th}$ transmission of the multicast signal.

Other objects and advantages of the present invention will become more readily apparent when reference is made to the following description in conjunction with the accompanying drawings.

DETAILED DESCRIPTION OF THE DRAWINGS

Figure 1:
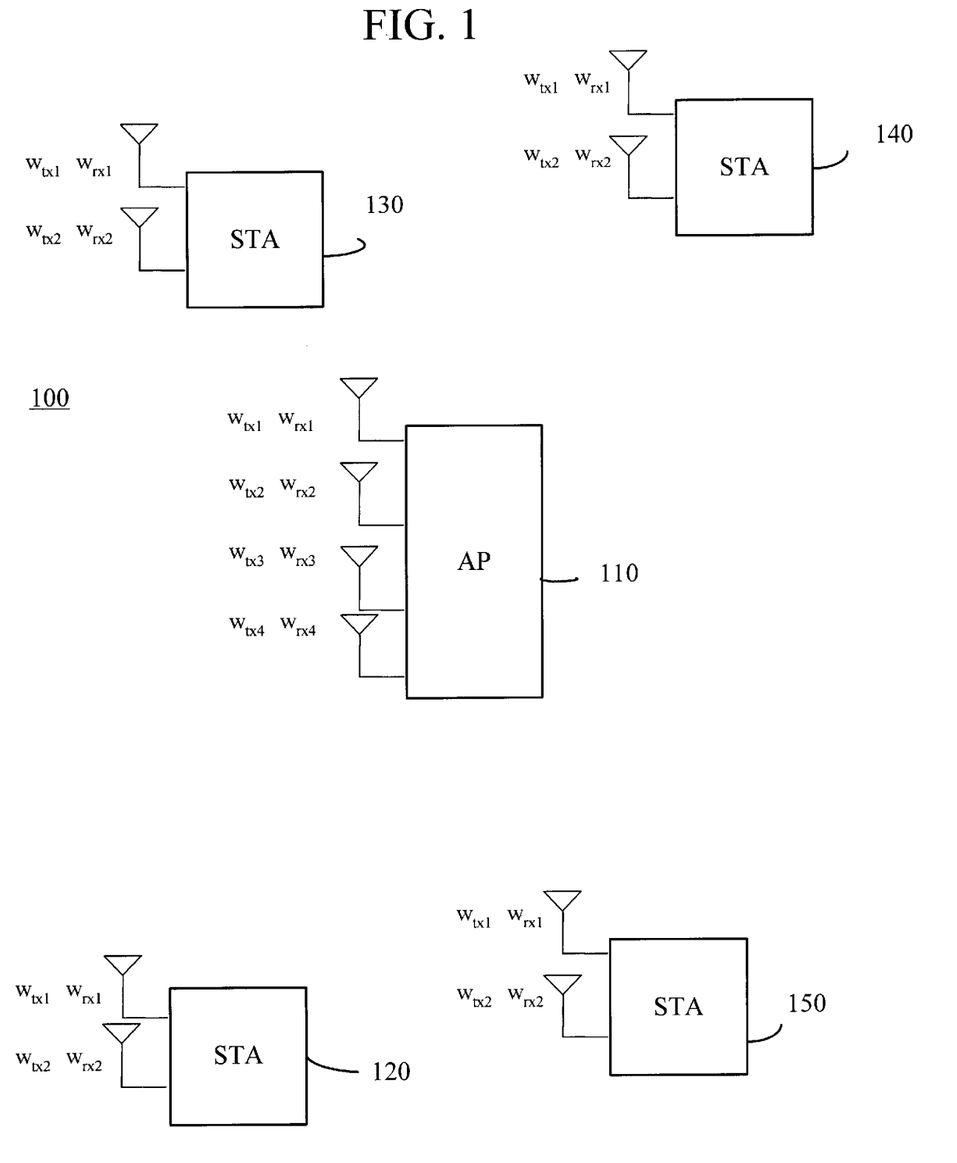
FIG. 1 is a block diagram of a wireless communication network comprising a plurality of communication terminals.

With reference first to FIG. 1, an example of a wireless application, such as a short-range wireless communication network 100 is shown. The wireless network is, for example, an IEEE 802.11x wireless local area network (WLAN), comprising an access point (AP) 110 and a plurality of stations (STAs) 120, 130, 140 and 150.

When two devices are in direct communication with each other, they use range-enhancement techniques, such as antenna selection diversity, composite beamforming, etc., for directed signal communication. For example, at least the AP 110, as well as some or all of the STAs have two or more antennas and are capable of performing composite beamforming. Specifically, a STA, such as STA 120, may have two antennas and when it transmits to another communication device in the network, such as the AP 110, it scales the transmit signal by complex transmit antenna weights $w_{tx1}$ and $w_{tx2}$ for the respective antennas. Similarly, when receiving a signal from the plurality of antennas of another device, such as the AP, it combines the signals received at its two antennas with complex receive antenna weights $w_{rx1}$ and $w_{rx2}$. The receive antenna weights are usually matched to the received signal at the antennas. The AP 110 has four antennas and therefore can perform 4x-beamforming when transmitting to another device and receiving from another device. Each device may determine and use optimum transmit antenna weights for a particular destination device through techniques described in the aforementioned co-pending application. In addition, each device may store this information for future use against an identifier for the corresponding destination device for use when transmitted to that device. The transmit antenna weights used by a device may are dependent on the particular destination device. Likewise, no two devices may use the same transmit antenna weights when transmitting to the same destination device. The transmit and receive antenna weights may be frequency dependent. When composite beamforming (CBF) is used between two communication devices that are in direct communication with each other, dramatic improvement in range is achieved as described in the aforementioned co-pending application. The communication devices may use other range enhancement techniques, such as antenna selection diversity, as opposed to CBF.

Again, the antenna processing techniques described above impact directed signal communication. In order to improve all around range performance, it is also necessary to improve the range for multicast signal communication. What follows are techniques to improve range for broadcast or multicast signal communication where CBF is used to extend range for point-to-point signal communication. The terms "unicast", "point-to-point" and "directed" are used synonymously and intechargeably herein. Likewisw, the terms "broadcast" and "multicast" are used interchangeably.

In a wireless network, such as the one shown in FIG. 1, range is important in when the user density (i.e., the demand for bandwidth) is relatively low, infrastructure cost (i.e., access point (AP) density) is critical, or both. Examples of such environments are home, home office and lightly populated corporate or campus environments.

Capacity C of a WLAN is average throughput per unit area (in kbps per square meters. Some general rules of thumb for network planning are:

Enterprise Wired LAN: 1 user per 250 sq. ft, 100 kbps per user: C=4 kbps/m2

Enterprise WLAN (office environment): C=0.5–4 kbps/m2

Conference rooms, public areas: C=10 kbps/m2

Airports, lecture halls, hotel lobbies, etc.: C=10–20 kbps/m2

Range is generally not important for high-capacity applications (i.e., for C>~4 kbps/m$^2$). For these applications, data rate at range, becomes the important network design parameter.

In a wireless communication network application that operates in a coverage area (e.g., a cell), the "range" of a cell may be defined by a radius around a communication device that achieves a certain error rate. For example, the range of an IEEE 802.11x cell is the maximum cell radius satisfying both of the following conditions at a specified AP/STA transmit power level:

1. 10% PER at the lowest data rate (e.g., 6 Mbps for 802.11a) for unicast data with a 5% outage probability (due to fading); and 2. Multicast data and beacon messages can be received w/PER<=10% with a 5% outage probability.

For an 802.11a AP with 2-selection diversity in an indoor delay spread environment, the range is approximately 55 meters (Ptx=17 dBm). For 802.11b, the range is approximately 115 meters (Ptx=20 dBm).

A device, such as the AP 110, may have different range modes, including a range-enhanced mode. For example, a network administrator may program this mode at the AP whenever range is to be extended (at the expense of less system throughput) beyond that of a single (omnidirectional) transmit (Tx) antenna for multicast signals. The AP may be configured to operate in directed range-enhanced mode, such as CBF mode where a signal (packet, etc.) is transmitted through all four antennas simultaneously with corresponding transmit antenna weights. Alternatively, the AP may be configured to operate in the omnidirectional mode (omni-mode) where a packet is transmitted through one of four antennas at the same total output power as CBF mode.

When directed signals are transmitted, the devices at both ends of the link use a range enhancement technique, such as CBF. When multicast signals are transmitted, there are several other range enhancement techniques that can be summarized as follows. A multicast signal may be transmitted multiple times, each time through a different one of a plurality of independent omnidirectional transmit antennas of a communication device to a plurality of other communication devices to improve packet error rate (PER) at a given range (i.e., SNR). More generally, the multicast signal can be transmitted up to N times using any set of N complex linearly independent N-dimensional transmit weight vectors $v_1, \ldots, v_N$ associated with N plurality of transmit antennas that meets the power constraint $\|v_i\|^2=1$, i=0, . . . ,N−1, and the vector $v_i$ is used for the i$^{th}$ transmission multicast signal. For certain multicast signals that are transmitted repeatedly, such signals are transmitted in a round-robin fashion, cycling through the N antennas, ad infinitem for each scheduled transmission of the signal. To more broadly state this latter case, the i$^{th}$ transmission is sent using transmit weight vector $v_{mod(i,N)}$, for the i$^{th}$ transmission of the signal, where mod(m,n) denotes the remainder of m divided by n, where i is not bounded by N. By transmitting the multicast signal in this manner, the likelihood that all communication devices, at various locations with respect to the source communication, will receive the signal, is greatly enhanced.

When it is necessary to reserve the radio frequency medium for directed signals, the source communication device precedes the transmission of the directed signals by sending a sequence of multicast clear-to-send (CTS) frames (once through each omnidirectional antenna or more generally each CTS transmission using one of the complex linearly independent N dimensional transmit weight vectors described above). Each CTS includes information that informs the plurality of other communication devices of the impending data transmission, thereby reserving the medium before data transmission. When reserving the medium for certain types of data, such as isochronous data, the AP transmits basic network information together with a delivery traffic indication map after the 4 CTS frames are sent. Any of these schemes can be further enhanced by transmitting the multicast signal with transmit delay diversity.

Figure 2:
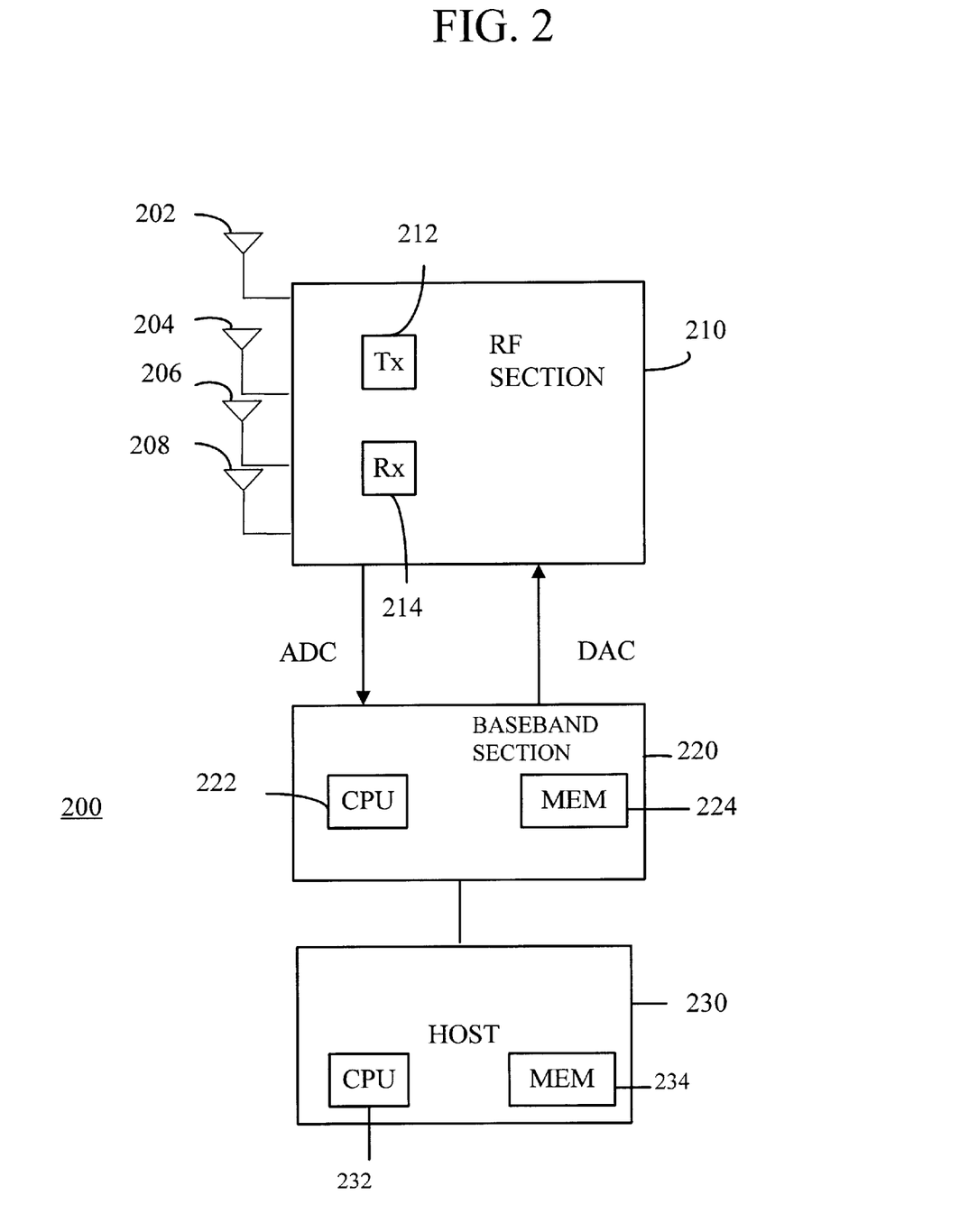
FIG. 2 a block diagram of an exemplary communication device suitable for use in the processes described herein.

FIG. 2 illustrates a block diagram of a STA or AP 200 that can be used for any one of the terminals shown in FIG. 1. The terminal in FIG. 3 comprises at least two antennas, though four antennas 202, 204, 206 and 208 are shown such as would be the case for the AP. An RF section 210 is coupled to the antennas 202–208, and includes a transmitter (Tx) 212 and a receiver (Rx) 214. A baseband section 220 is coupled to the RF section 210. The baseband section 220 may include a CPU or processor 222 and memory 224. The processor 222 performs the processing steps in the communication device that are described hereinafter. The memory 224 stores the channel transfer function information (e.g., transmit antenna weights) associated with a particular destination device that is retrievable by the processor 222. For example, the memory 224 is random access memory (RAM). The CPU 222 executes instructions that are stored or encoded on a processor readable medium that when cause the CPU to perform the processes described above in conjunction with FIG. 2. Alternatively, the baseband section may be implemented by a digital application specific integrated circuit (ASIC) with a synthesized processor core and/or may include dedicated processor functionality such as field programmable gates that implement digital signal processor instructions to perform the processes described herein. The baseband section 220 is coupled to a host processor 230. Still another alternative is for the processing steps to be performed by a host processor 232 (in a host 230) by executing instructions stored in (or encoded on) a processor readable memory 234. The RF section 210 may be embodied by one integrated circuit, and the baseband section 220 may be embodied by another integrated circuit. The communication device on each end of the communication link need not have the same device architecture or implementation.

The baseband section 220, either by way of the processor 222, or through other dedicated functionality (such as field programmable gates) multiplies the signal to be transmitted by corresponding transmit antenna weights and likewise multiplies signals received at each of the antennas by corresponding receive antenna weights and combines the resulting signals to recover the received signal therefrom. When it is stated hereinafter that a communication device transmits a signal to another communication using "CBF", this means that the transmitting communication device multiplies the signal by transmit antenna weights (corresponding to the plurality of antennas of the transmitting communication device) corresponding to a destination device, that optimize reception of the signal at the destination device. The transmit and receive antenna weights have real and imaginary components (magnitude and phase) that may vary with frequency to account for the frequency response of the communication medium between transmit and receive communication devices, as described in the aforementioned co-pending applications. When transmitting a signal through a single antenna, the baseband section 220 multiplies the signal with a transmit weight vector that weights one antenna and nulls all of the other antennas. For example, to select antenna 202 (out of four antennas), the transmit weight vector is (1 0 0 0), to select antenna 204, the transmit weight vector is (0 1 0 0), etc. More generally, the processor in the baseband section 220 processes the multicast signal using any set of N complex linearly independent N-dimensional transmit weight vectors $v_1, \ldots, v_N$ associated with N plurality of transmit antennas that meets the power constraint $\|v_i\|^2=1$, $i=0, \ldots, N-1$, where the vector $v_i$ is used for the $i^{th}$ transmission of the multicast signal. For example, for N=4, one transmission of the multicast signal is sent with the transmit weight vector (1 0 1 0) and the next transmission it is sent with the transmit weight vector (0 1 0 1), and so on.

The transmitter 312 upconverts signals to be transmitted by the antennas 302–308 and the receiver 314 downconverts signals received by the antennas. In the case where the terminal has just two antennas to perform antenna selection diversity, there is a switch in the RF section that selects one of the two antennas for reception of transmission of signals.

Figure 3:
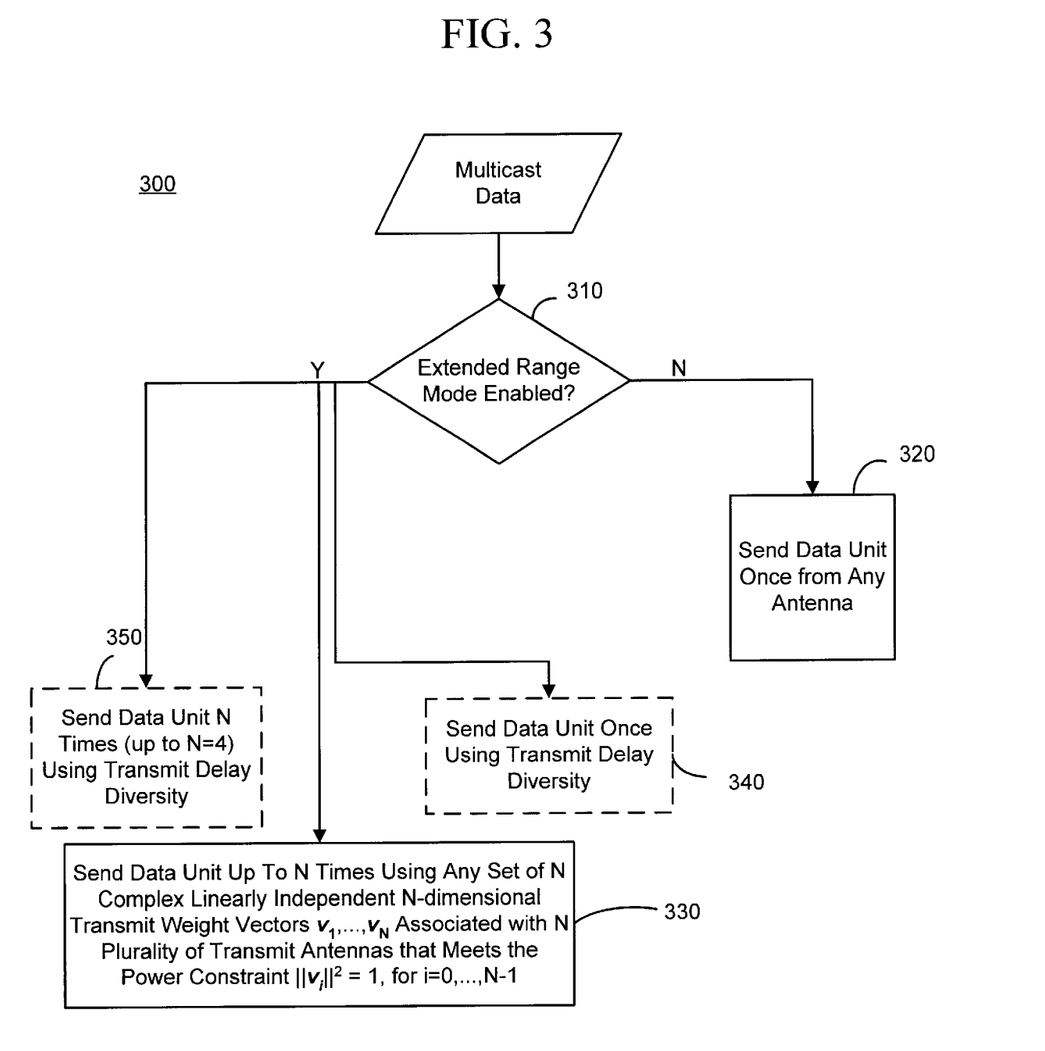
FIG. 3 is a flow chart illustrating a procedure for transmitting multicast signals in a wireless communication network.

FIG. 3 shows a process 300 for transmitting a multicast data signal from an AP to multiple (or all) STAs. For example, the data unit is a media service data unit (MSDU) or a MAC protocol data unit (MPDU) according to IEEE 802.11x WLAN protocol. In step 310, the AP determines whether the extended mode of operation is enabled or disabled. If the extended mode is disabled, then in step 320, the AP transmits the data unit once from of its plurality of antennas. If it is determined in step 310 that the extended mode is enabled, then in step 330, the AP transmits the data unit up to a total of N times, once through each of its plurality of antennas, or more generally, the AP may send the data unit up to N times using any set of N complex linearly independent N-dimensional transmit weight vectors $v_1, \ldots, v_N$ associated with N plurality of transmit antennas that meets the power constraint $\|v_i\|^2=1$, $i=0, \ldots, N-1$, where the vector $v_i$ is used for the $i^{th}$ transmission of the multicast signal. This approach gives significant improvement in PER (at the expense of lower throughput) due to antenna diversity and repeated transmission by increasing the likelihood that the data unit will be received by each STA. When implementing this approach, the AP uses the Sequence Number and Retry subfields in the MAC header to ensure proper duplicate filtering in the STAs.

TABLE 1

|  | 0 ns RMS Delay Spread | | | 50 ns RMS Delay Spread | | | 150 ns RMS Delay Spread | | |
| --- | --- | --- | --- | --- | --- | --- | --- | --- | --- |
| N = # Repetitions | 2-WBS STAs | 2-CBF STAs | 4-CBF STAs | 2-WBS STAs | 2-CBF STAs | 4-CBF STAs | 2-WBS STAs | 2-CBF STAs | 4-CBF STAs |
| 1 | 0 | 2 | 9 | 0.5 | 4 | 9 | 1 | 5.5 | 10 |
| 2 | 8.5 | 9.5 | 13 | 7.5 | 9 | 14 | 6 | 9 | 14 |
| 4 | 10.5 | 11.5 | 14 | 8.5 | 11 | 14 | 8 | 10 | 14 |

The table above shows, through simulations, sensitivity improvement in dB at 10% PER for 802.11a at 24 Mbps relative to the 2-WBS, delay spread=0 ns, N=1 case. "WBS" means STAs using 2-antenna wideband selection diversity as opposed to CBF-enhanced STAs.

FIG. 3 also shows other alternatives to step 330. For example, in step 340, to improve range, the AP may send the data unit once using transmit delay diversity. This means essentially that a delay is introduced between the transmissions of the data unit among the plurality of AP antennas according to a transmit vector $x(t)=[x_0(t), x_1(t-\tau_D), \ldots, x_{Nt-1}(t-(Nt-1))\tau_D]$, where N is the number of AP antenas used for transmission and $\tau_D$ is a transmit delay parameter. In essence, the signal will be sent from each antenna with a different delay spread and such that the maximum delay spread between any two antennas is $(N-1)\tau_D$. It has been found through performance simulations that a transmit delay parameter $\tau_D$ of 1000 ns provides optimal delay spread, but can be programmable to span 50 ns to 150 ns, for example.

Still another alternative shown in step 350 is to transmit the data unit a total of N times (up to the number of antennas), each time using transmit delay diversity (as described above).

Figure 4:
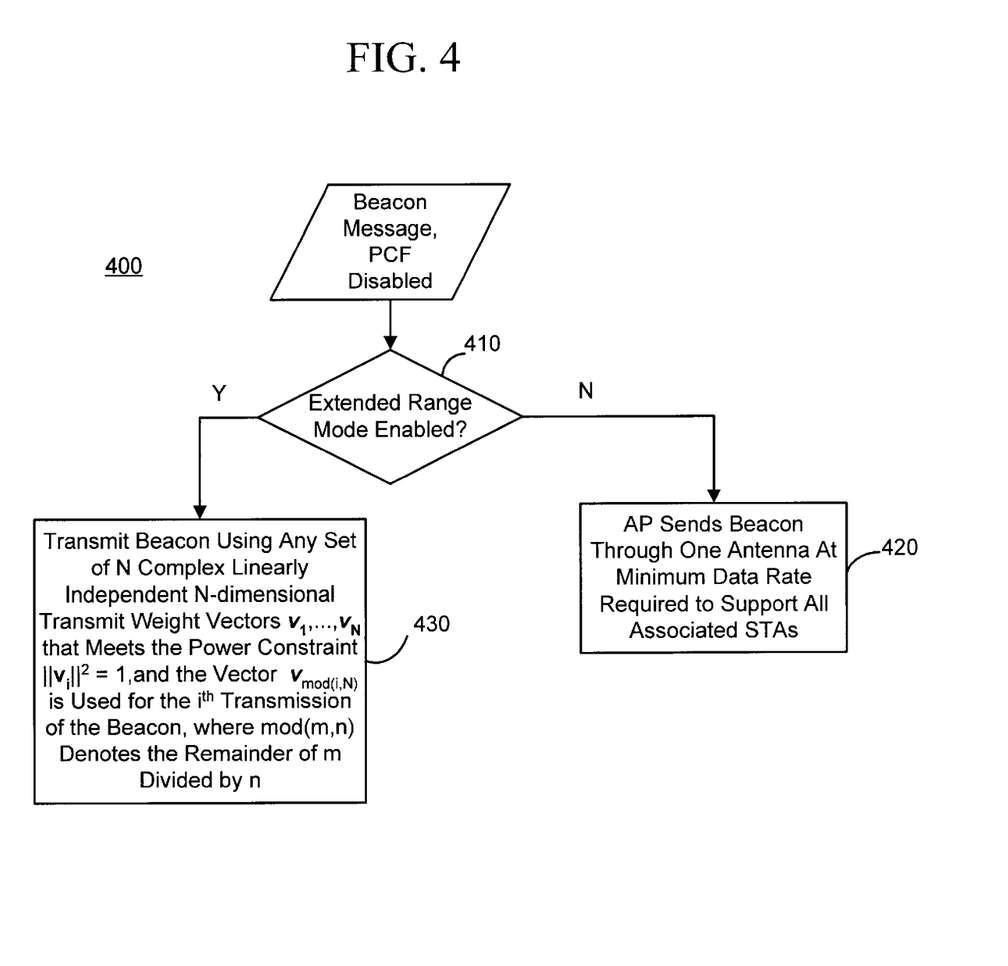
FIG. 4 is a flow chart illustrating a procedure for transmitting a beacon type message.

FIG. 4 shows a process 400 for transmitting another type of multicast signal that is used to inform all communication devices (e.g. STAs) about subsequent signals scheduled for transmission on the radio frequency medium. As an example, this multicast signal is a Beacon frame that is sent when the point coordination function (PCF) is disabled. PCF is an IEEE 802.11x function that is a centrally controlled access mechanism that uses a poll and response protocol to eliminate the possibility of contention for the medium. The PCF will be described further below. According to the IEEE 802.11x WLAN protocol, the Beacon frame is transmitted periodically to allow mobile stations to locate and identify a basic service set (BSS) in time and physical parameters at any time in the future. The Beacon frame also conveys information to stations about frames that may be buffered during times of low power operation. Elements of a Beacon frame include the service set identity (SSID), the supported rates of the BSS, one or more PHY parameter sets, an optional contention-free parameter set, an optional IBSS parameter set and an optional traffic indication map.

If the extended range mode is disabled (step 410), then in step 420, the AP transmits a Beacon frame through one antenna at the minimum data rate required to support all associated STAs. If the extended range mode is enabled, then in step 430, the AP transmits the Beacon frame sequentially through each antenna, moving to the next AP antennas each time the Beacon frame is scheduled to be transmitted, in a round-robin fashion at a minimum data rate required to support all STAs, ad infinitum for Beacon transmissions. The same power save (PS) list is used for all Beacons. This process provides significant performance enhancement relative to the single antenna case, since each STA sees multiple repetitions of the Beacon with independent fading for up to four repetitions.

Again, more generally, the Beacon can be transmitted using the transmit weight vector $v_{mod(i,N)}$, for the $i^{th}$ transmission of the Beacon, where mod(m,n) denotes the remainder of m divided by n. In this case, the number of transmissions i is not bounded by N−1. This is useful for sending Beacon frames on an ongoing, repetitive basis.

Data from Table 1 can be used to quantify performance. For an indoor environment w/50 ns delay spread, for example, a STA can reliably decode a beacon after 2 repetitions using 7.5 dB less Rx power, and after 4 repetitions using 8.5 dB less power.

Like the multicast data unit process of FIG. 3, the Beacon frame can alternatively be transmitted once through using transmit delay diversity, or N times, each time using transmit delay diversity.

Figure 5:
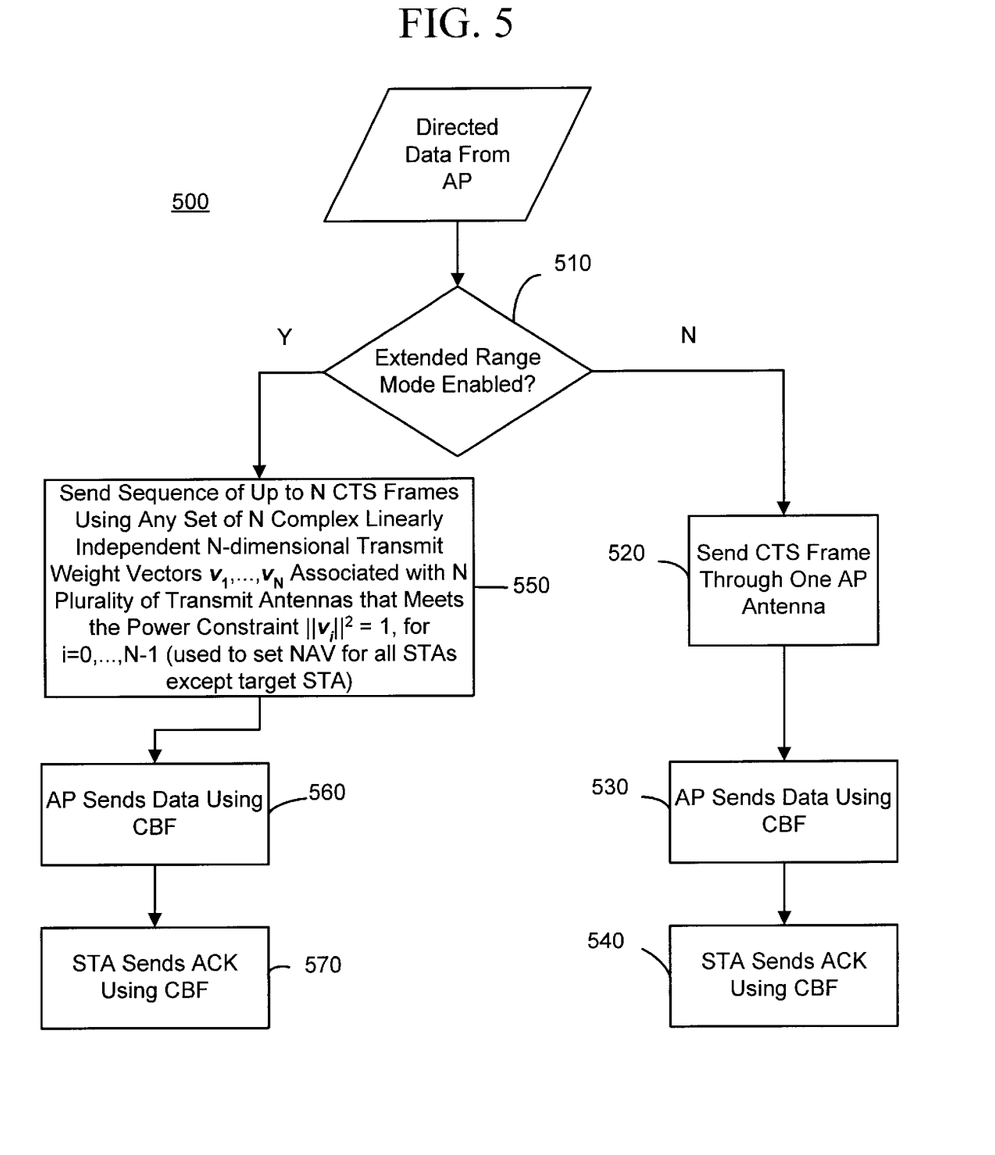
FIG. 5 is a flow chart illustrating a procedure for transmitting directed data from an access point.

FIG. 5 shows a process 500 for transmitting directed data from a source communication device (the AP) to a destination communication device (a particular STA). The data may be, for example, a directed MSDU or MPDU. In order to transmit the directed data, the source communication device reserves the communication medium by alerting all of the other communication devices (with a multicast signal) of the impending data transmission. In step 510, the AP determines whether the extended range mode is enabled. When it is not enabled, the frame sequence is {CTS-} {frag-ACK-} last-ACK. Specifically, in step 520, the AP sends a clear-to-send (CTS) frame through one AP antennas to announce to all STAs in the neighborhood of both the AP and the destination STA of the impending transmission from the AP to the destination STA. The CTS is optional and only necessary if system simulations show that other STAs have difficulty receiving directed data units sent in CBF mode. Next, in step 530, the AP transmits the data unit to the destination STA using CBF. In step 540, if and when the STA receives the data unit, it transmits an acknowledgment frame (ACK) to the AP using CBF.

If in step 510, the AP determines that the extended range mode is enabled, then the sequence is {CTS×N-} {frag-ACK-} last-ACK. Specifically, in step 550, CTS×N is a sequence of up to N CTS frames (N equals the number of AP antennas) each CTS frame sent through a different AP antenna and used to set the network allocation vector (NAV) for STAs other than the destination STA. More generally, the CTS frame is sent up to N times any set of N complex linearly independent N-dimensional transmit weight vectors $v_1, \ldots, v_N$ associated with N plurality of transmit antennas that meets the power constraint $\|v_i\|^2=1$, i=0, ..., N−1, where the vector $v_i$ is used for the $i^{th}$ transmission of the multicast signal. The NAV is an 802.11x frame that informs STAs of the amount of time before the medium will become available. In step 560, the AP transmits the data unit to the destination STA using CBF, and in step 570, when the STA receives the data unit, it transmits an ACK to the AP using CBF.

Like the process of FIG. 3, the CTS frame can alternatively be transmitted once through an antenna using transmit delay diversity, or N times, each time using transmit delay diversity.

Figure 6:
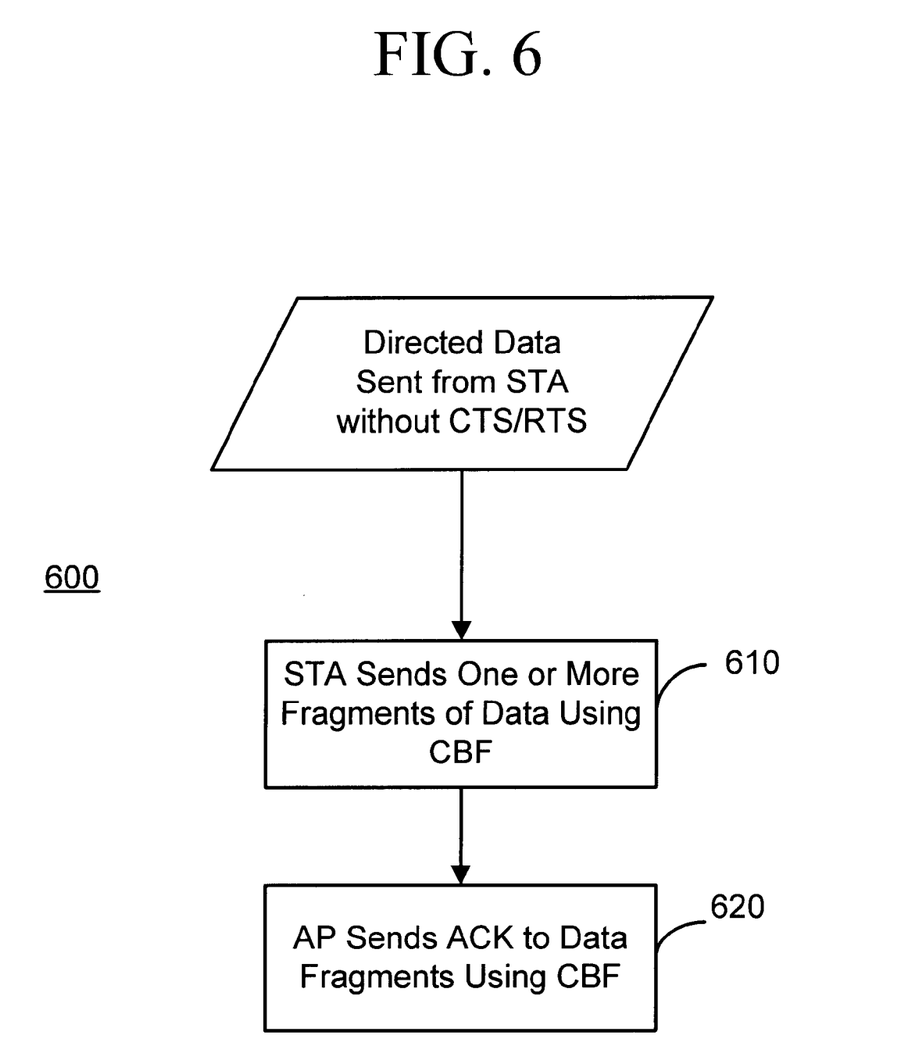
FIG. 6 is a flow chart illustrating a procedure for transmitting directed data from a station not using a clear-to-send/request-to-send process.

FIG. 6 shows a process 600 useful when a STA sends a directed data unit (MSDU or MPDU) without the request-to-send (RTS)/CTS scheme. The RTS frame is a signal directed to the AP that requests the AP to reserve the medium for transmission of data from the STA to the AP. The sequence {frag-ACK-} last-ACK is useful regardless of whether the extended range mode is enabled or disabled. In step 610, the STA transmits one or more data fragments to the AP using CBF. In step 620, if and when the AP receives the data fragments, it transmits an ACK to the STA using CBF.

Figure 7:
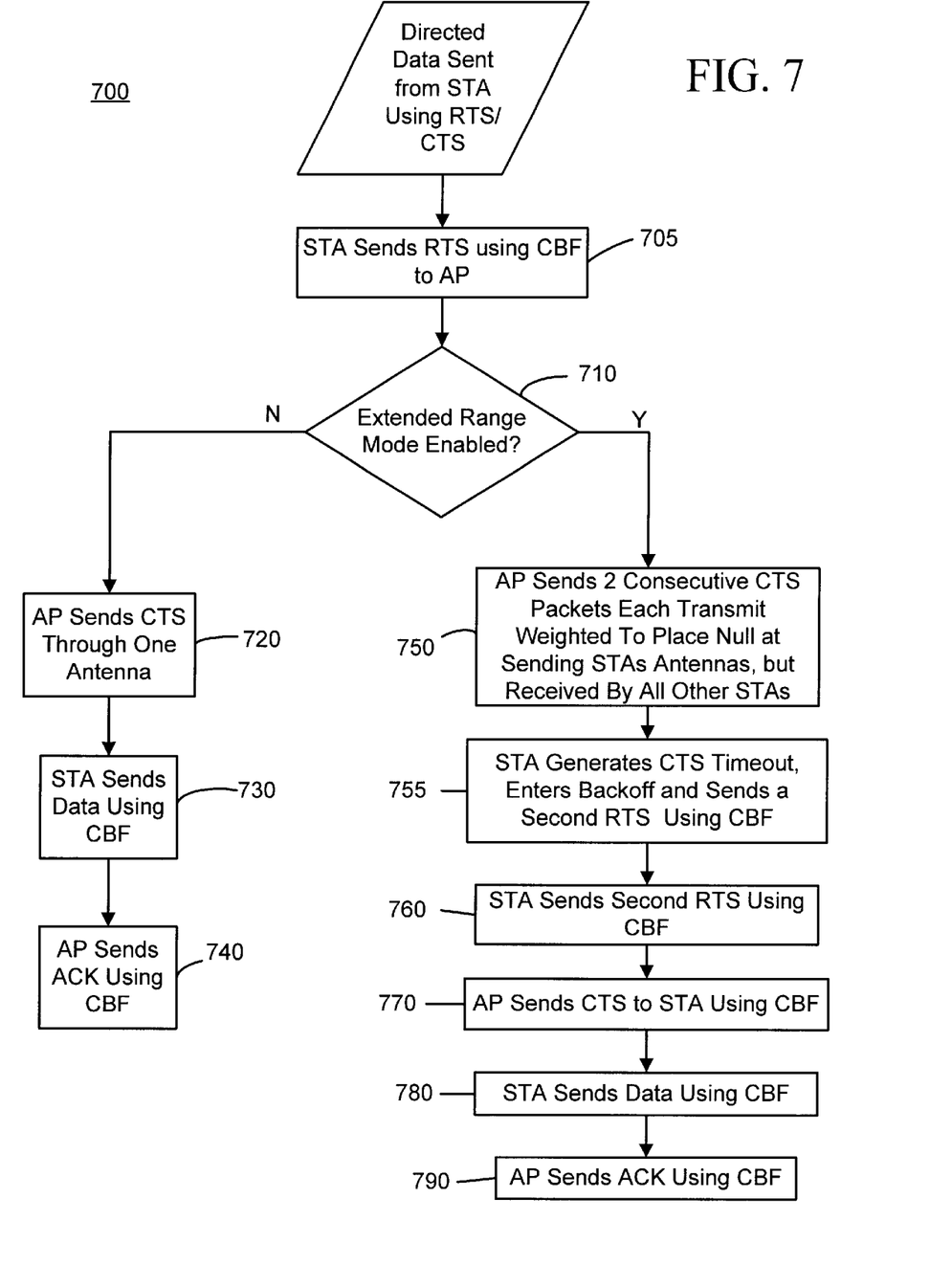
FIG. 7 is a flow chart illustrating a procedure for transmitting directed data from a station using a clear-to-send/request-to-send process.

FIG. 7 illustrates a process 700 useful when a STA transmits a directed data unit using the RTS/CTS scheme. In step 705, the STA sends an RTS frame to the AP using a directed range-enhancement technique, such as CBF, and upon receiving the RTS frame the AP determines whether the extended range mode is enabled. If the extended range mode is not enabled when the AP receives the RTS, then the sequence is CTS-{frag-ACK-} last-ACK. Specifically, in step 720, in response to receiving the RTS, the AP transmits a CTS frame through one AP antenna. In response to receiving the CTS, in step 730, the STA transmits the data unit using CBF. In step 740, when the AP receives the data unit, it transmits an ACK using CBF.

When the AP receives the RTS and determines that the extended range mode is enabled, the sequence is: CTS*-timeout-backoff-RTS-CTS-{frag-ACK-} last-ACK. Specifically, in step 750, in response to receiving the RTS, the AP transmits a sequence of first and second consecutive CTS frames addressed to the AP each time using a transmit weight vector that is in the null space of H, where H represents the channel response matrix between the AP and the sending STA, such that when the CTS frames are transmitted by the AP antennas, a null is placed at the sending STA's antennas. Furthermore, in addition to being in the null space of H, the transmit weight vectors for the two CTS frames may be linearly independent transmit weight vectors in order to improve performance by generating independent fading for each CTS. Such can be the case if the AP has four antennas and the STAs have two antennas, so that there are at least two linearly independent vectors in the null space of H. The AP can determine the channel response matrix H when it receives a signal, such as an RTS frame, from the STA, as described in the aforementioned co-pending applications incorporated herein by reference, and from that information determine the transmit weight vector that satisfies this condition.

This sequence is referred to as CTS* and it ensures that all STAs except the sending STA receive at least one of the CTS frames and stay off the medium during the data transmission. Since the sending STA does not receive either CTS* frame (due to the null), in step 755, the sending STA will generate a CTS timeout, execute a back-off, and in step 760 send a second RTS packet (using CBF if it is CBF-capable). In step 770, the AP responds to the second RTS by transmitting a CTS frame (using CBF) addressed to the sending STA. In step 780, the STA responds to the CTS and transmits a data fragment burst using CBF. In step 790, when the AP receives the data fragments, it transmits an ACK using CBF. The network allocation vector (NAV) in the CTS* sequence is long enough to complete this transaction in the worst case.

Figure 8:
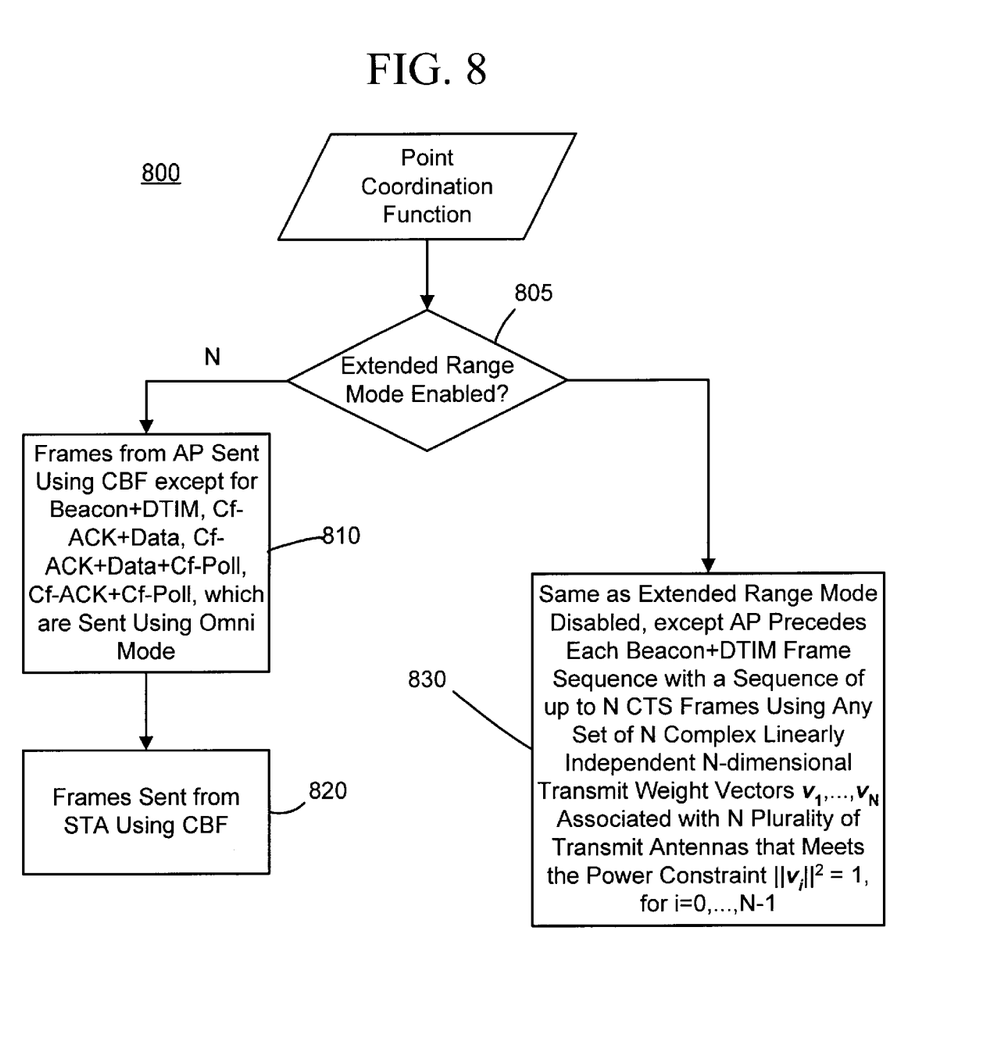
FIG. 8 is a flow chart illustrating a procedure for communication when a point coordination function is enabled in the network.

FIG. 8 shows a process 900 useful for the PCF operation. In the PCF operation, a point coordinator (PC) located in an AP receives requests from STAs to register them on a polling list, and the PC then regularly polls the STAs for traffic while also delivering traffic to the STAs. The PCF is able to deliver near-isochronous service to the STAs on the polling list. The PCF is built over the distributed coordination function (DCF) and both operate simultaneously. When the extended range mode is disabled (step 805), in step 810 the AP transmits frames as follows.

Beacon+DTIM: Omni mode
Cf-poll: CBF mode
Cf-ACK: CBF mode
Data: CBF mode
ACK: CBF mode
Cf-ACK+data, Cf-ACK+Data+Cf-Poll, Cf-ACK+Cf-Poll: Omni mode The STA transmits frames in step 820 as follows.
Cf-ACK: CBF mode
Data: CBF mode
Data+Cf-ACK: CBF mode
ACK: CBF mode
Null: CBF mode In step 830, operation when the extended range mode is enabled is the same as when the extended range mode is disabled, except that the AP precedes each Beacon+DTIM (delivery traffic indication map) with a sequence of up to 4 CTS frames each sent through a different AP antenna, or each sent with up to N times using any set of N complex linearly independent N-dimensional transmit weight vectors $v_1, \ldots, v_N$ associated with N plurality of transmit antennas that meets the power constraint $\|v_i\|^2=1$, $i=0, \ldots, N-1$, where the vector $v_i$ is used for the $i^{th}$ transmission of the multicast signal. The CTS frames reserve the medium prior to the contention free period (CFP) for the entire duration of the CFP, and the repetition of these packets improves the likelihood that at least one CTS is received by all STAs in extended range mode. The Beacon frame is sent in this case through one antenna. The 4 CTS frames will reserve the medium for the duration of the contention free period (CFP) even if the beacon is not received by some STAs. The PCF operation is useful for communication of isochronous data, such as voice or video.

Like the process of FIG. 3, the CTS frame of step 830 can alternatively be transmitted once using transmit delay diversity, or N times, each time using transmit delay diversity.

Other frames of interest are STA initiated sequences including the PS-Poll sequence and the announcement traffic indication map (ATIM) frame. In the PS-Poll scheme, a PS-Poll is sent from the STA using CBF and the AP sends an ACK using CBF. For the ATIM frame, the ATIM is sent from an otherwise CBF-capable STA using a single antenna. Alternatively, a STA can send a directed ATIM in CBF mode.

TABLE 2

| Case | Typical 2-WBS NIC + AP | 2-WBS NIC, 4-CBF AP | 2-CBF NIC, 4-CBF AP | 4-CBF NIC, 4-CBF AP |
|---|---|---|---|---|
| Directed Data—AP to STA (dB) | 0 | 11 | 14 | 16.5 |
| Directed Data—STA to AP (dB) | 0 | 11 | 14 | 16.5 |
| Multicast Messages (dB) | 0 | 8 | 10 | 14 |
| Beacons (dB) | 0 | 8 | 10 | 14 |
| Minimum of Above (dB) | 0 | 8 | 10 | 14 |
| Range Improvement (%) | 0% | 75% | 101% | 166% |
| Coverage Area Improvement (%) | 0% | 205% | 304% | 605% |
| Reduction in AP density (%) | 0% | 67% | 75% | 86% |

Table 2 shows the range improvement for CBF-enhanced 802.11a relative to a "typical" NIC+AP case, using the enhancements described above (typical means 2-antenna wideband selection diversity on both NIC and AP). The first four rows show link margin improvement (in dB) for directed data, multicast data and Beacons and the information for multicast data and beacons is taken from Table 1, where it is assumed both multicast messages are repeated 4 times through each Tx antenna, and Beacons are sent round-robin through each antenna. Range improvements are computed as 10 lmi/33, where lmi represents the minimum link margin improvement over rows 1–4 in the table, and 33 represents the path loss coefficient for the indoor wireless channel.

To summarize, the range improvements over the typical AP+NIC case are:
75% percent range improvement (8 dB) for 4×-CBF AP and typical NICs;
100% percent range improvement (10 dB) for 4×-CBF AP and 2×-CBF NICs; and
166% percent range improvement (14 dB) for 4×-CBF AP and 4×-CBF NICs.

Figure 9:
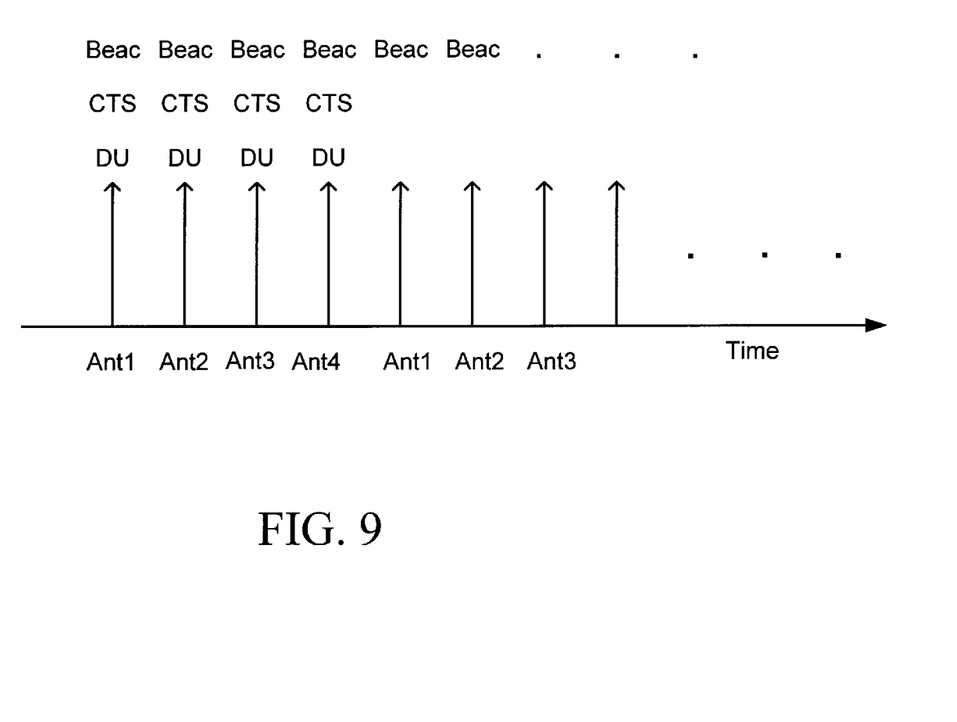
FIG. 9 is a timing diagram showing the repetitive transmission of certain multicast signals.

FIG. 9 illustrates a timing diagram to depict the timing of transmission of the multicast signals of FIGS. 3–5 and 8. FIG. 9 shows that an AP having four antennas that, as one example, transmits the multicast data unit (DU) once from each antenna Ant1 through Ant4 sequentially in time. Similarly, the AP transmits a CTS frame once from each antenna Ant1 through Ant4. The AP transmits the Beacon frame once from each antenna Ant1 through Ant4 in a round-robin fashion for each scheduled Beacon frame. These are simplified examples of the more general case where the transmit antenna weight vectors can be any set of N complex linearly independent N-dimensional transmit weight vectors $v_1, \ldots, v_N$ associated with N plurality of transmit antennas that meets the power constraint $\|v_i\|^2=1$.

To summarize, techniques are provided to enhance the range of multicast signals by transmitting the signal up to N times any set of N complex linearly independent N-dimensional transmit weight vectors $v_1, \ldots, v_N$ associated with N plurality of transmit antennas that meets the power constraint $\|v_i\|^2=1$, i=0, . . . ,N−1, where the vector $v_i$ is used for the $i^{th}$ transmission of the signal. Other related methods are provided to enhance the range of multicast signals, such as the method of responding to a RTS signal from a communication device and sending at least one CTS signal using a transmit weight vector that is in the null space of the channel response matrix between the two communication devices. These methods may be implemented by instructions encoded on a medium, such as processor readable medium, or field programmable gates on an integrated circuit.

The above description is intended by way of example only.

What is claimed is:

1. In a wireless communication system having a plurality of communication devices in which directed communication between two communication devices is performed using range-enhanced communication techniques, a method for enhancing the range of communication for multicast signals from a first communication device to a plurality of other communication device, comprising transmitting a signal intended for reception by the plurality of other communication devices up to N times any set of N complex linearly independent N-dimensional transmit weight vectors $v_1, \ldots , v_N$ associated with N plurality of transmit antennas that meets the power constraint $\|v_i\|^2=1$, i=0, . . . ,N−1, where the vector $v_i$ is used for the $i^{th}$ transmission of the signal.

2. The method of claim 1, wherein N=4, and the transmit weight vectors are $(1000)^T$, $(0100)^T$, $(0010)^T$ and $(0001)^T$.

3. The method of claim 1, wherein the step of transmitting comprises transmitting the signal with the transmit weight vector $v_{mod(i,N)}$, for the $i^{th}$ transmission of the signal, where mod(m,n) denotes the remainder of m divided by n, where i is not bounded by N.

4. The method of claim 3, wherein the signal includes information containing at least one of an identifier of a wireless network, data rates supported by the wireless network, and contention-free parameters and traffic information of data to be transmitted by the first communication device.

5. The method of claim 1, and further comprising the step of determining whether the first communication device is operating in an extended range mode, and if so, executing the step of transmitting.

6. The method of claim 5, and further comprising the step of transmitting the signal once from one of the plurality of antennas if the first communication device is not operating in the extended range mode.

7. The method of claim 1, wherein the signal includes information which informs the plurality of other communication devices not to transmit on a radio frequency medium for a time interval.

8. The method of claim 7, wherein the signal further includes information that informs the plurality of other communication devices the amount of time before the radio frequency medium will become available.

9. The method of claim 8, after transmission of the signal, further comprising the step of transmitting a first signal containing information including at least one of an identifier of a wireless network, rates supported by the wireless network, and contention-free parameters followed by a second signal containing information about frames that are buffered at the first communication device for certain ones of the plurality of other communication devices.

10. The method of claim 9, wherein the step of transmitting the first signal comprises transmitting the first signal via one of the plurality of antennas of the first communication device.

11. A method for wireless communication comprising steps of:

a. transmitting a signal intended for a particular communication device from a plurality of antennas of the first communication device using antenna processing techniques to maximize the range of communication with the particular communication device; and b. transmitting a signal intended for reception by the plurality of other communication devices up to N times using any set of N complex linearly independent N-dimensional transmit weight vectors $v_1, \ldots , v_N$ associated with N plurality of transmit antennas that meets the power constraint $\|v_i\|^2=1$, i=0, . . . ,N−1, where the vector $v_i$ is used for the $i^{th}$ transmission of the signal.

12. The method of claim 11, wherein the step of transmitting comprises transmitting the signal intended for a plurality of communication devices with the transmit weight vector $v_{mod(i,N)}$, for the $i^{th}$ transmission of the signal, where mod(m,n) denotes the remainder of m divided by n. where number transmissions i is not bounded by N−1.

13. A medium encoded with instructions that, when executed, perform a method comprising a step of processing a signal intended for reception by a plurality of communication devices for transmission up to N times with any set of N complex linearly independent N-dimensional transmit weight vectors $v_1, \ldots , v_N$ associated with N plurality of transmit antennas that meets the power constraint $\|v_i\|^2=1$, i=0, . . . ,N−1, where the vector $v_i$ is used for the $i^{th}$ transmission of the signal.

14. The medium of claim 13, and further encoded with instructions that, when executed, process a signal intended for a particular communication device via the N plurality of antennas using antenna processing techniques to maximize the range of communication of the signal to the particular communication device.

15. The medium of claim 14, wherein the instructions to process a signal intended for a particular communication device comprise instructions to process the signal with transmit antenna weights, corresponding to the N plurality of antennas that optimize reception of the signal by the particular communication device.

16. The medium of claim 13, and further encoded with instructions that, when executed, generate the signal to contain information including at least one of an identifier of a wireless network, data rates supported by the wireless network, and contention-free parameters and traffic information of data to be transmitted by the first wireless communication device.

17. The medium of claim 13, and further encoded with instructions that, when executed, generate the signal to include information that informs the plurality of the other communication devices of an impending transmission on a radio communication medium.

18. The medium of claim 13, and further encoded with instructions that, when executed, process the signal with the transmit weight vector $v_{mod(i,N)}$, for the $i^{th}$ transmission of the signal, where mod(m,n) denotes the remainder of m divided by n, where number transmissions i is not bounded by N−1.

19. The medium of claim 13, wherein instructions are implemented by field programmable gates.

20. An integrated circuit comprising the medium of claim 13.

* * * * *

UNITED STATES PATENT AND TRADEMARK OFFICE
CERTIFICATE OF CORRECTION

PATENT NO.   : 6,862,456 B2
DATED        : March 1, 2005
INVENTOR(S)  : Sugar et al.

It is certified that error appears in the above-identified patent and that said Letters Patent is hereby corrected as shown below:

Title page,
Item [57], ABSTRACT,
Line 9, after the word "using", delete "up to N times".
Line 10, before the word "any", delete "using".

Column 2,
Line 9, after the word "FIG. 2", insert -- is --.

Colunm 3,
Line 16, after the word "and", delete "intechargeably", and insert therefor
-- interchangeably --.
Line 16, after the word "herein.", delete "Likewisw", and insert therefor -- Likewise --.

Column 4,
Line 59, after the word "that", delete -- when --.

Column 5,
Line 57, after the word "transmitter", delete "312", and insert therefor -- 212 --.
Line 58, after the word "antennas", delete "302-308", and insert therefor -- 202-208 --.
Line 58, after the word "receiver", delete "314", and insert therefor -- 214 --.

Column 6,
Line 3, after the word "from", insert -- one --.
Line 45, after the word "AP", delete "antenas", and insert therefor -- antennas --.

Column 8,
Line 1, after the word "times", insert -- using --.
Line 32, after the word "enabled", insert -- , step 710 --.

Column 9,
Line 12, after the word "process", delete "900", and insert therefor -- 800 --.

Column 11,
Lines 1 and 24, after the word "times", insert -- using --.

Column 12,
Line 21, after the word "by", delete "n." and insert therefor -- n, --.
Line 24, after the word "executed", insert -- in a communication device that includes a transmitter for upconverting signals to be transmitted --.

UNITED STATES PATENT AND TRADEMARK OFFICE
CERTIFICATE OF CORRECTION

PATENT NO.     : 6,862,456 B2
DATED          : March 1, 2005
INVENTOR(S)    : Sugar et al.

It is certified that error appears in the above-identified patent and that said Letters Patent is hereby corrected as shown below:

Column 12 (cont'd),
Line 60, after the word "where", delete "number" and insert therefor -- the number of --.
Line 62, after the word "wherein", insert -- the --.
Line 63, after the word "by", delete "field programmable".

Signed and Sealed this

Eighteenth Day of October, 2005

JON W. DUDAS
*Director of the United States Patent and Trademark Office*